United States Patent [19]

Buckholtz et al.

[11] 4,301,014
[45] Nov. 17, 1981

[54] PHOSPHORUS PENTASULFIDE WASTE WATER TREATMENT

[75] Inventors: Harry E. Buckholtz, Lewiston; Joseph J. Moritz; Joseph S. Wisnouskas, both of Grand Island, all of N.Y.

[73] Assignee: Hooker Chemicals & Plastics Corp., Niagara Falls, N.Y.

[21] Appl. No.: 156,539

[22] Filed: Jun. 5, 1980

[51] Int. Cl.³ .............................................. C02F 1/52
[52] U.S. Cl. ................................... 210/721; 210/754; 210/759; 210/760; 210/906; 423/303
[58] Field of Search ............... 210/702, 710, 711, 721, 210/722, 754, 756, 759, 760, 761, 762, 763, 906; 423/224, 226, 303

[56] References Cited

U.S. PATENT DOCUMENTS

| | | | |
|---|---|---|---|
| 1,054,250 | 2/1913 | Stock | 423/303 |
| 1,900,757 | 3/1933 | Baehr | 423/224 |
| 1,956,463 | 4/1934 | Lyon | 210/710 |
| 1,968,114 | 7/1934 | Windecker | 210/710 |
| 2,897,150 | 7/1959 | Bencowitz | 210/721 |
| 3,171,804 | 3/1965 | Rice | 210/702 |
| 3,359,200 | 12/1967 | Gitchel | 210/761 |
| 3,761,409 | 9/1973 | McCoy | 210/761 |
| 3,853,759 | 12/1974 | Titmas | 210/761 |
| 3,912,626 | 10/1975 | Ely | 210/721 |
| 4,012,321 | 3/1977 | Koubek | 210/761 |
| 4,083,945 | 4/1978 | Fenton | 423/226 |
| 4,173,532 | 11/1979 | Keoteklian | 210/721 |

FOREIGN PATENT DOCUMENTS

| | | | |
|---|---|---|---|
| 51-14752 | 2/1976 | Japan | 210/721 |
| 54-104482 | 8/1979 | Japan | 423/303 |
| 1387510 | 3/1975 | United Kingdom | 210/761 |

Primary Examiner—Ernest G. Therkorn
Attorney, Agent, or Firm—Thomas T. Gordon

[57] ABSTRACT

The process disclosed in this invention takes the waste solids, gases, and water from a phosphorus pentasulfide manufacturing facility and hydrolyzes the phosphorus pentasulfide by heating. The phosphorus portion is converted to a soluble phosphate and the sulfur portion to a mixture of sulfide, sulfite and sulfate. The soluble fraction is then treated with a calcium hydroxide solution precipitating the phosphate and sulfates which are removed. The gaseous portion of the hydrolysis is fed to a catalytic oxidizer which converts the sulfides to sulfur, which is removed and the gas, free of sulfur containing species, is exhausted to the atmosphere. The filtrate from the precipitation reaction can be recycled to the plan' or may be chlorinated and discharged.

19 Claims, 1 Drawing Figure

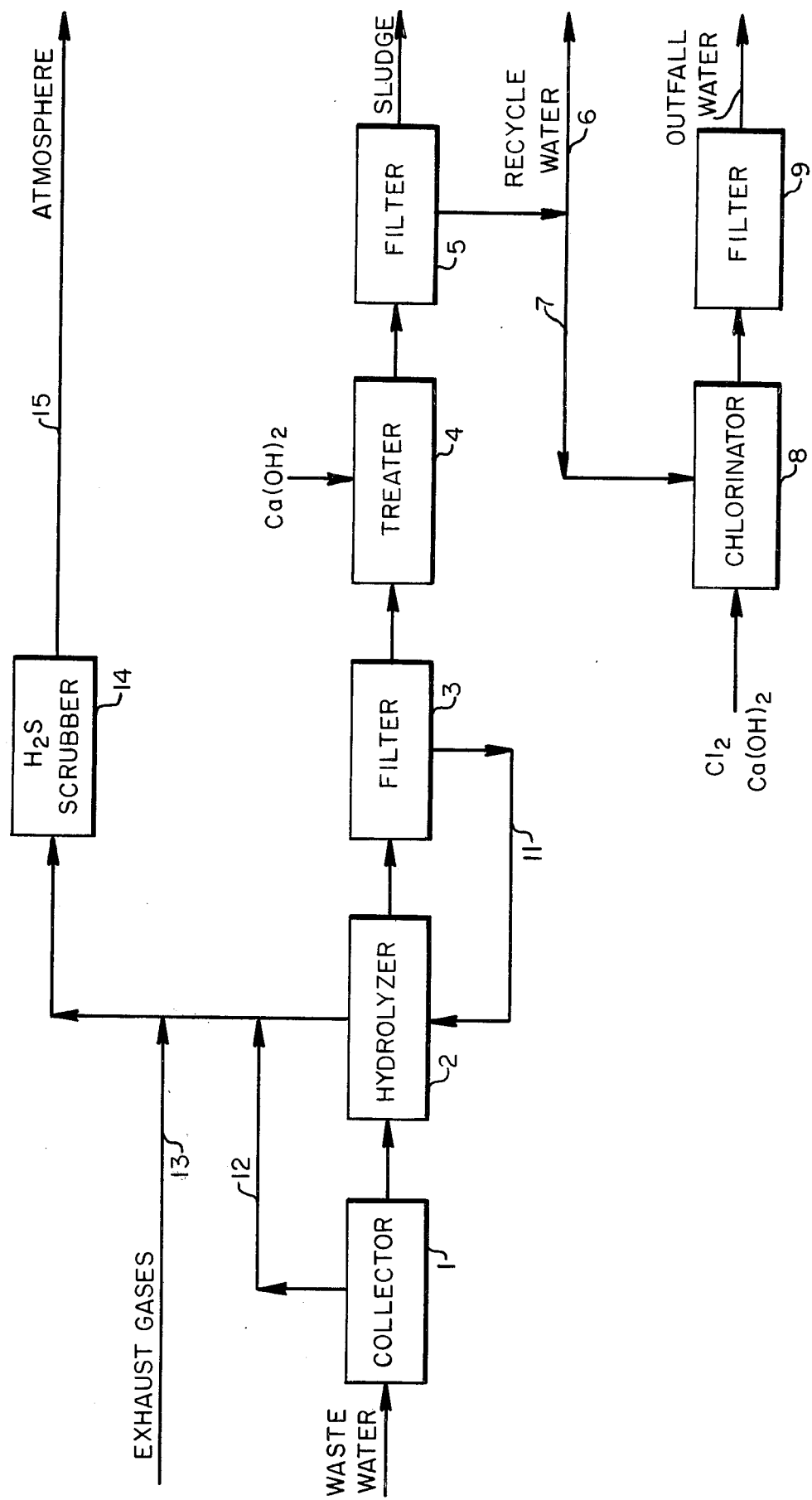

PHOSPHORUS PENTASULFIDE WASTE WATER TREATMENT

BACKGROUND OF THE INVENTION

The purification of waste water and the rendering innocuous of waste solids is an important part of virtually every modern industrial process. In particular, much effort has been expended in recent years in insuring that the risk of pollution is minimized by the treatment of waste water before it is discharged into rivers, lakes, and other waterways and to eliminate future risks associated with waste solids. Another important reason for the treatment of waste water is that it enables the water to be recycled for use in the industrial process, allowing more efficient use of water and reducing the economics of the industrial process by reclaiming materials that would otherwise be discarded. The environmental problems associated with industrial chemical processes has led industry into a position wherein no materials adversely affecting the environmental process should be discharged into the water cycle of the earth.

This invention relates to the treatment of waste waters and solids produced in a process for the manufacture of phosphorus pentasulfide, and enables the water to be recycled through the process and allows for its safe discharge into streams, rivers, or lakes.

Phosphorus pentasulfide is manufactured by reacting elemental phosphorus with molten sulfur in approximately stoichiometric proportions. The crude product is usually distilled and cast into molds or cast in a thin film on a cold surface. The product may be distilled and quick chilled under inert gases to obtain a more reactive form. Phosphorus pentasulfide ($P_4S_{10}$) melts in the range 286°–290° C. and boils at 513°–545° C. It is a reddish brown in liquid form and yellow in solid form. It is slowly decomposed by cold water and forms mainly hydrogen sulfide and orthophosphoric acid. At high pH it is hydrolyzed to a mixture of products containing thiophosphates and sulfides. Exact reactions of hydrolysis are imperfectly understood and sensitive to system changes.

There are four major sources of solids and contaminated water from a phosphorus pentasulfide manufacturing facility that constitute the bulk of the waste water. These are water used in washing equipment and returnable shipping bins, fume scrubbers, water from pouring station scrubbers, water from dust scrubbers and water from roofs, drains, rain, etc. which contain amounts of phosphorus pentasulfide as a result of contact with the solid.

Prior to environmental restrictions imposed by state and federal agencies, the industrial waste water was generally collected in a storage facility such as a pond or tank to allow any solid material to settle out, and the liquid then was discharged. The solid materials were transferred to a burial site. With environmental restrictions imposed upon industry, the water discharged into streams, rivers, and lakes must be essentially pure and non-polluting and should not affect the oxygen balance of the waterway. This has led to purification systems, material recovery systems, and the recycling of water within the industrial plant. The invention described in this document concerns the waste treatment system for a phosphorus pentasulfide facility, and the rendering innocuous of phosphorus pentasulfide contained within the stream entering the waste treatment process.

It is the object of this invention, therefore, to provide an effective treatment for all sources of phosphorus pentasulfide waste associated with a phosphorus pentasulfide manufacturing process, to chemically transform its phosphorus and sulfur content so that essentially pure water can be discharged into the environment and a solid containing essentially calcium phosphate, gypsum and elemental sulfur can be generated for safe landfill. Further, no forms of airborne sulfur or phosphorus based contaminants should emanate from the process.

It is also an object of this invention to provide a treatment process for the purification of water associated with waste treatment to allow its recycling back into the plant for further use.

SUMMARY OF THE INVENTION

The process disclosed in this invention takes the collected waste water from a phosphorus pentasulfide manufacturing facility and hydrolyzes the phosphorus pentasulfide contained therein by heating. The phosphorus portion is converted to a soluble orthophosphate and sulfur portion to a mixture of sulfide, sulfite and sulfate. Any unreacted phosphorus pentasulfide is removed by filtration and returned to the hydrolyzer. The filtrate is then treated with a calcium hydroxide solution precipitating the phosphate and sulfates which are removed. The gaseous portion of the hydrolysis is fed to a scrubber which converts the sulfides to sulfur which is removed and the gas, free of sulfur containing gases, is exhausted to the atmosphere. The filtrate from the precipitation reaction can be recycled to the plant, or may be chlorinated and its pH adjusted, filtered and can be safely discharged.

BRIEF DESCRIPTION OF THE DRAWING

The drawing illustrates a schematic block diagram of the process.

DETAILED DESCRIPTION OF THE INVENTION

Waste water, as used herein, is water with or without contained solids, from any source connected with the manufacture or storage or use of phosphorus pentasulfide. As previously stated four sources constitute the major areas of origin of waste water: (a) the washing of equipment, (b) water from pouring station scrubbers, (c) water from dust scrubbers, and (d) casual water from roofs, drains, rain, etc.

The waste water is fed into a storage tank or collector (1) for processing. There will not necessarily be a constant flow of waste water from each of the above named sources into the collecting tank, due to the manufacturing operation being, in most cases, a non-continuous operation, and equipment washing, for example, will occur at intervals during the process, so the flow will vary, and the content of the $P_4S_{10}$ in the collector tank will fluctuate over a time period.

The waste water will then be fed from the collector tank (1) to a hydrolyzer (2) wherein the hydrolysis reaction will be enhanced by the application of heat and agitation. The temperature of the hydrolyzer is maintained within the preferred range of 50°–60° C., and the contents will remain in the tank for about 3 to 6 hours. The time will vary with the temperature and the temperature may range between 25° and 100° C. The pH during this period remains on the acidic side due to the formation of phosphoric acids. During the hydrolysis, the $P_4S_{10}$ will be essentially entirely decomposed to hydrogen sulfide, sulfites, sulfates and phosphates. The conversion of $P_4S_{10}$ to the orthophosphate form must be at least 50% complete to ensure high phosphate removal efficiency by precipitation. The application of heat during the hydrolysis reaction and the acidic pH ensure a rapid conversion of $P_4S_{10}$ to the orthophosphate form, the form most amenable to removal of precipitation.

During the hydrolysis reaction, due to the heat and agitation, the hydrogen sulfide generated will be liberated from the vessel and is removed to the scrubber (14), which will be described later.

Following the hydrolysis step the liquid portion is passed through a filter (3) to remove any unreacted $P_4S_{10}$, which is returned to the hydrolyzer (2).

The filtrate is passed to a treater tank (4) where a calcium hydroxide solution is added and precipitates are formed. Calcium phosphates, sulfates and sulfites are the basis of the precipitate formed. Sufficient calcium hydroxide is added so that the pH of the reaction remains in the 8 to 10 region. In order to obtain the maximum precipitation of phosphates by the addition of the lime, it is necessary that the hydrolysis convert the majority of the phosphorus to the orthophosphate form, and this is best accomplished by the acid hydrolysis which has been conducted.

The calcium hydroxide added to the treater tank can be prepared by adding lime to water and the aqueous solution is then fed to the treater tank for the precipitation to occur. It should be noted that although the basic purpose of the calcium hydroxide addition is to precipitate the phosphates present, other salts may be precipitated depending upon the content of the waste water. For example, in many cases iron compounds are present and will be precipitated by the addition of the calcium hydroxide.

Materials other than calcium hydroxide may be used to obtain the precipitation of the phosphates and sulfates present. Some of these materials are ferrous sulfate, ferric sulfite, ferric chloride, magnesium hydroxide, sodium aluminate, hydrated aluminum sulfate, to mention but a few.

Upon completion of the precipitation reaction, the contents of the treater tank (4) are fed to a filter (5), wherein the precipitate is removed. The precipitate can be treated with calcium hypochlorite, or other active oxidizing agent, such as elemental chlorine, sodium hypochlorite, hydrogen peroxide, sodium chlorate, etc. to react with any precipitated sulfides present and lower the COD of the precipitate or sludge before disposal.

The filtrate, essentially phosphate free, can be returned to the plant (6) for reuse in the processing operation. The water is essentially of the same purity as the water originally utilized in the plant operation.

If, in order to maintain the water balance of the system, the filtrate is to be discharged from the plant into a waterway, additional treatment (7) with chlorine may be necessary to reduce the COD of the outfall water, and pH adjustment may be necessary. This chlorination step (8) is accomplished by maintaining the pH of the filtrate at about 5 with an alkaline hydroxide solution while passing chlorine gas into the stream. Chlorine is passed into the filtrate at a rate of about 1 to 2 cc/min/1.5 liters. The outfall water would have its final pH adjusted to a range of 6 to 9 depending upon the conditions of the stream or lake into which it is to be discarded. Filtration (9) of the outfall water will remove any suspended solids. An additional benefit of the alkaline chlorination is the conversion of any condensed phosphates or thiophosphate compounds to the orthophosphate form. This results in additional phosphate removal upon adjusting the chlorinated water to a pH of 9. The phosphates are removed as a precipitate by the filter (9) and polishes the outfall water prior to discharge to the waterway.

Hydrogen peroxide, ozone, sodium hypochlorite, calcium hypochlorite etc. may be substituted for the chlorine to reduce the COD of the outfall water.

Returning to the hydrogen sulfide generated during the hydrolysis step, due to the temperature of the hydrolysis reaction and agitation, the hydrogen sulfide produced will be released from the hydrolysis mixture and will be vented to a thermal incinerator, a caustic scrubber, or a scrubber (14) which contains a catalytic oxidizer which converts sulfide to sulfur.

Prior to its entry into the hydrogen sulfide destruction unit, additional gases (13) may be incorporated into the stream. These gases may come from fume hoods, vent pipes, etc. or any source of air that might contain phosphorus pentasulfide, or its reaction products.

The collector tank (1) will also produce gases, primarily hydrogen sulfide, due to hydrolysis that will occur during storage and this gas will be vented (12) to the gas stream from the hydrolyzer (2) to the scrubber (14).

A hydrogen sulfide destruction unit or scrubber (14) may be of the type that converts the hydrogen sulfide to elemental sulfur which will be removed, leaving the gas to be exhausted to the atmosphere (15) free of sulfide and acceptable, by environmental standards, to be discharged. The scrubber unit may be of the type known as a catalytic oxidation scrubber, sold commercially by several manufacturers such as Rhodia Incorporated under the tradename "Cat-a-Ban" or "Lo-cat," manufactured by Air Resources Inc. In these devices, the sulfide is converted to elemental sulfur which is removed from the gas stream and used or disposed of, according to the will of the operator. In these types of units, a scrubbing action of the gas streams occurs before the gas is exhausted to the atmosphere. If the operator desires, an alkaline material, typically caustic soda, may be substituted for the catalytic oxidation chemicals. In the alkaline case, caustic sulfides generated in the scrubber may be collected and may be used in markets requiring these chemical entitles.

To further illustrate the present invention, the following examples are provided showing some specific embodiments of the invention; they are not, however, to be construed as in any way limiting the scope of the invention.

EXAMPLE 1

In a 20 liter vessel was placed 18 liters of water and 76.4 grams of phosphorus pentasulfide. This mixture was agitated and heated to a temperature of 50°-60° C. for six hours. The resultant mixture was filtered to remove any unreacted $P_4S_{10}$ and the mixture was analyzed to show the completeness of the hydrolysis. The mixture had the following analysis:

| pH | 1.8 | | |
|---|---|---|---|
| Sulfide | 70 | ppm | $S^=$ |
| Sulfite | 60 | mg/l | $SO_3^=$ as $Na_2SO_3$ |
| Sulfate | 5 | mg/l | $SO_4^=$ |
| Orthophosphate | 3,500 | mg/l | $PO_4^{---=}$ |

-continued

| Total phosphate | 6,000 | mg/l | $PO_4{}^=$ |
|---|---|---|---|

To this mixture was added 105 grams of calcium hydroxide for the precipitation reaction, and the mixture was agitated for a period of 30 to 60 minutes to insure complete reaction. The precipitate was removed by filtration and the filtrate had the following composition:

| pH | 8.8 | | |
|---|---|---|---|
| Chloride | 83 | mg/l | $Cl^-$ |
| Sulfide | 5.0 | ppm | $S^=$ |
| Sulfite | 50 | mg/l | $SO_3{}^=$ as $Na_2SO_3$ |
| Sulfate | 1 | mg/l | $SO_4{}^=$ |
| Orthophosphate | 0.4 | mg/l | $PO_4{}^=$ |
| Total phosphate | 50 | mg/l | $PO_4{}^=$ |

At this stage, hydrogen sulfide was purged into the filtrate to better simulate the plant conditions, and the sulfide was added until the sulfide level was raised to 220 ppm $S^=$. A portion of the filtrate (1.5 liters) was removed from the above lime treated filtrate and was chlorinated by passing chlorine in at the rate of 5 cc/minute. The pH was maintained at a level of 9 by the addition of calcium hydroxide. Chlorine was added for 84 minutes, the pH was readjusted to 9 by additional calcium hydroxide, the total amount needed for both adjustment was 4 grams. The mixture was filtered and the filtrate had the following composition:

| pH | 9.0 | | |
|---|---|---|---|
| Chlorine | 0.12 | mg/l | residual $Cl_2$ |
| Chloride | 2158 | mg/l | $Cl^-$ |
| Sulfide | 0.22 | ppm | $S^=$ |
| Sulfite | 0 | mg/l | $SO_3{}^=$ |
| Sulfate | 680 | mg/l | $SO_4{}^=$ |
| Total phosphate | 27.5 | mg/l | $PO_4{}^=$ |

Before filtration, there were 104 mg/l of suspended solids. The amount of chlorine used equal moles $Cl_2/moles\ H_2S = 1.75$, and the amount of calcium hydroxide used is:

$$\frac{moles\ Ca(OH)_2}{moles\ H_2S} = 5.4$$

This process demonstrates efficiency of phosphate removal as 99.5% has been removed. Also it should be noted that the alkaline chlorination step reduced the total phosphate level from 50 mg/l to 27.5 mg/l.

EXAMPLE 2

A sample was taken from the waste water collected from a phosphorus pentasulfide manufacturing plant and filtered to remove any undissolved $P_4S_{10}$ and other solids. The analysis of the liquid showed the following:

| pH | 2.1 | |
|---|---|---|
| Sulfide | 25 | ppm |
| Sulfite | 20 | mg/l |
| Sulfate | 30 | mg/l |
| Orthophosphate | 3,200 | mg.l |
| Total phosphate | 7,000 | mg/l |

The waste water containing undissolved phosphorus pentasulfide, as collected from the plant site, was placed in a hydrolyzer, as in Example 1, and heated at 50° C. for 3 hours with agitation to hydrolyze the $P_4S_{10}$ present. The liquid contained the following phosphates:

| Orthophosphate | 26,000 mg/l |
|---|---|
| Total phosphates | 96,000 mg/liter |

This liquid was treated with an aqueous solution of lime as in Example 1, and precipitation occurred. Following filtration of the precipitate the filtrate had a pH of 9.1 and contained 1280 mg/l total phosphate.

The filtrate was chlorinated, as in Example 1, and the pH before adjustment was 2.4, additional precipitation occurred which was removed by filtration, the filtrate contained 180 mg/l total phosphate, or 99.8% removal.

EXAMPLE 3

The precipitate from this lime treatment of Example 2 was dark grey in color, and contained 5.0 ppm sulfide and 0.24% sulfite. To 4300 grams of precipitate or sludge was added 4.4 grams of calcium hypochlorite and agitated. The color changed from dark grey to a very light grey and the resultant slurry contained less than 0.1 ppm sulfide, thus reducing the COD of the slurry.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

We claim:

1. A process for the treatment of waste water resulting from the manufacture, use or storage of phosphorus pentasulfide comprising:
    a. collecting the waste water,
    b. hydrolyzing the $P_4S_{10}$ to phosphates, sulfides, sulfites and sulfates,
    c. filtering the hydrolysis mixture to remove any unreacted $P_4S_{10}$, returning the insolubles for further hydrolysis,
    d. treating the soluble portion of the hydrolysis step with a solution of cation that will react with the soluble phosphate anion to precipitate,
    e. removing the precipitate from the mixture,
    f. oxidizing the filtrate, adjusting the pH, filtering to remove any solids to allow discharge to the environment.
    g. passing the gaseous output of the hydrolysis step b. into a catalytic scrubber to remove the sulfur, and
    h. venting the gaseous output from the scrubber to the atmosphere.

2. The process of claim 1, wherein gaseous fumes from the manufacturing facility are combined with the gaseous output of the hydrolysis step b. for treatment.

3. The process of claim 1, wherein the temperature of the hydrolysis step is maintained within the range of about 25° to about 100° C.

4. The process of claim 1, wherein the temperature of the hydrolysis step is maintained within the range of about 50° to about 60° C.

5. The process of claim 4, wherein hydrolysis is conducted for a period of about 3 to about 6 hours.

6. The process of claim 1, wherein the precipitate of step (d) is reacted with an oxidizing agent to reduce the COD of the precipitate.

7. The process of claim 6, wherein the oxidizing agent is selected from a group containing calcium hypochlorite, sodium hypochlorite, hydrogen peroxide, ozone, or chlorine.

8. The process of claim 1, wherein the cation solution is selected from the group consisting of calcium hydroxide, hydrated aluminum sulfate, sodium aluminate, ferrous sulfate, ferric sulfate or magnesium hydroxide.

9. The process of claim 8, wherein the cation solution is calcium hydroxide.

10. The process of claim 1 wherein the oxidizer used in step (f) is selected from the group consisting of chlorine, hydrogen peroxide, ozone, calcium hypochlorite or sodium hypochlorite.

11. The process of claim 10 wherein the oxidizer used in step (f) is chlorine.

12. A process for the preparation of essentially phosphate free water from waste water resulting from the manufacture, use or storage of phosphorus pentasulfide comprising:
 a. collecting the waste water,
 b. hydrolyzing the $P_4S_{10}$ to phosphates, sulfides, and sulfates,
 c. filtering the hydrolysis mixture to remove any unreacted $P_4S_{10}$, returning the insoluble portion for further hydrolysis,
 d. treating the soluble portion of the hydrolysis step with a solution of cation that will react with the soluble phosphate anion to precipitate.
 e. removing the precipitate from the mixture,
 f. oxidizing the filtrate, adjusting the pH, filtering to remove any solids to allow discharge to the environment,
 g. passing the gaseous output of hydrolysis step b. into a catalytic scrubber to remove the sulfur, and
 h. venting the gaseous output from the scrubber to the atmosphere.

13. The process of claim 12, wherein the temperature of the hydrolysis step is maintained within the range of about 25° to about 100° C.

14. The process of claim 12, wherein the temperature of the hydrolysis step is maintained within the range of about 50° to about 60° C.

15. The process of claim 14, wherein hydrolysis is conducted for a period of about 3 to about 6 hours.

16. The process of claim 12 wherein the cation solution is selected from the group consisting of calcium hydroxide, hydrated aluminum sulfate, sodium aluminate, ferrous sulfate, ferric sulfate or magnesium hydroxide.

17. The process of claim 16, wherein the cation solution is calcium hydroxide.

18. The process of claim 12, wherein the oxidizer of step (f) is selected from the group consisting of chlorine, hydrogen peroxide, ozone, calcium hypochlorite or sodium hypochlorite.

19. The process of claim 12, wherein the oxidizer of step (f) is chlorine.

* * * * *